United States Patent [19]

Murai et al.

[11] Patent Number: 5,014,625
[45] Date of Patent: May 14, 1991

[54] LINEAR MOTOR DRIVEN TROLLEY CONVEYOR

[75] Inventors: Masasumi Murai, Tokorozawa; Koichi Mizuguchi, Higashi-yamato; Jun Nishiyama, Amagasaki, all of Japan

[73] Assignee: Tsubakimoto Chain Company, Osaka, Japan

[21] Appl. No.: 376,121

[22] Filed: Jul. 5, 1989

[30] Foreign Application Priority Data

Jul. 6, 1988 [JP] Japan .................................. 63-89050

[51] Int. Cl.$^5$ ........................................... H02K 41/02
[52] U.S. Cl. .................................. 104/292; 105/176; 104/172.3
[58] Field of Search .............. 104/140, 139, 290, 292, 104/165, 282, 291, 294, 172.3; 105/176, 3

[56] References Cited

U.S. PATENT DOCUMENTS

| | | | |
|---|---|---|---|
| 3,610,160 | 10/1971 | Alimanestianu | 104/76 |
| 3,792,665 | 2/1974 | Nelson | 104/292 |
| 4,794,866 | 1/1989 | Brandis et al. | 104/292 |
| 4,800,818 | 1/1989 | Kawaguchi et al. | 104/290 |
| 4,841,869 | 6/1989 | Takeuchi et al. | 104/292 |

Primary Examiner—Robert J. Oberleitner
Assistant Examiner—Mark T. Le
Attorney, Agent, or Firm—Ferrill and Logan

[57] ABSTRACT

A linear motor driven conveyor which includes a carrier rail and primary members provided within a pit, main trolleys adapted to run along the carrier rail and connected with a carrying frame, and front and rear trolleys. The connecting members are pivotably connected vertically and horizontally with each trolley within the pit, the lower surfaces of the connecting members each having a reaction plate of a linear induction motor.

8 Claims, 15 Drawing Sheets

LINEAR MOTOR DRIVEN TROLLEY CONVEYOR

FIELD OF INVENTION

This invention relates to a trolley conveyor driven by linear motor for use in conveyance of articles, such as, automotive bodies.

BACKGROUND OF INVENTION

Conventionally, trucks in a conveyor are driven by a driving chain. In such a conveyor, the driving chain is moving at all times even while the trucks are stored in storage lines, which promotes occurrence of wear of the driving chain as well as noises. Moreover, in order to start the trucks, it is necessary to engage the driving chain with the pressure plate provided to the trucks, which causes a shock at the time of engagement. Such a shock of course becomes greater in proportion to the speed of the driving chain. For these reasons, the upper limit of the speed of the conventional conveyor has been some 18 meters per second. Thus, the conventional chain drive conveyors are not suitable for high speed conveyance.

One solution of this problem is to use a conveyor driven by linear motor. In known linear motor drive systems, primary members of linear induction motor are provided on the floor and reaction plates which constitute the secondary members of a linear induction motor are provided to the trucks, respectively; and by maintaining the gap between the two members accurately and energizing the primary members, the trucks are electromagnetically propelled.

However, if there is a horizontal curve in the conveying path, the locus of the reaction plate is likely to be diverted from the primary members; and if there are curves or undulations in the vertical direction, the reaction plates are subjected to movements up and down. Thus, there occurs unevenness of the gap, which will result in instability or reduction in the propelling force. Consequently, conventional linear motor drive systems have been used only in straight conveying lines.

Accordingly, one object of this invention is to provide a linear motor driven trolley conveyor which is capable of stably driving trucks even where there are horizontal curves or slopes in the conveying path.

SUMMARY OF INVENTION

The present invention is in the first place a linear motor driven trolley conveyor comprising a carrier rail and primary members provided within a pit, main trolleys adapted to run along said carrier rail and connected with a carrying frame, a front and rear trolleys, connecting members pivotably connected with each of said trolleys within said pit, the lower surfaces of said connecting members each having a reaction plate of a linear induction motor.

The connecting members are, so to speak, divided by the trolleys and are capable of moving independently of each other. Therefore, even if there is a horizontal curve in the conveying path, the connecting members will not substantially deviate from the primary members provided that the curvature is relatively small.

Since the reaction plates are in effect divided as mentioned above, they are capable of following the primary members even in an inclined path.

Moreover, if each of the truck is provided with a pressure plate which is adapted to be selectively engageable with the driving chain, selective conveyance by means either of linear motor or driving chain is possible.

Thus, articles, such as, automotive bodies maybe quietly conveyed at a high speed by means of linear motor drive even when there are horizontal curves or slopes in the conveying path.

The present invention is in the second place a linear motor driven conveyor comprising a carrier rail and primary members provided within a pit, trolleys adapted to run along said carrier rail, connecting members pivotably connected with each of said trolleys within said pit, at least one pair of tilting prevention rollers and guide rails for supporting said rollers.

In the second invention, the function itself of the trolley conveyor is basically the same as that of the first invention. In the second invention, swaying of the connecting members may be suppressed, since the carrier rail cooperates with the trolleys. Moreover, swinging of the connecting members may also be prevented as the tilting prevention rollers run on the guide rails. Thus, in a horizontal curve, even if the reaction plate and the primary members are not exactly aligned in the vertical direction and momental force acts on the reaction plate due to the magnetic attractive force, the reaction plate may retain the horizontal position, thereby maintaining the gap with the primary members accurately.

According to the second invention, tilting of the reaction plate may effectively be prevented not only in a horizontal curve but in a slope, thereby keeping the gap with the primary members uniformly.

BRIEF DESCRIPTION OF DRAWINGS

The drawings show preferred embodiments of the present invention, in which.

EMBODIMENTS

With reference to accompanying drawings, preferred embodiments will be explained hereinbelow.

Figure 1:
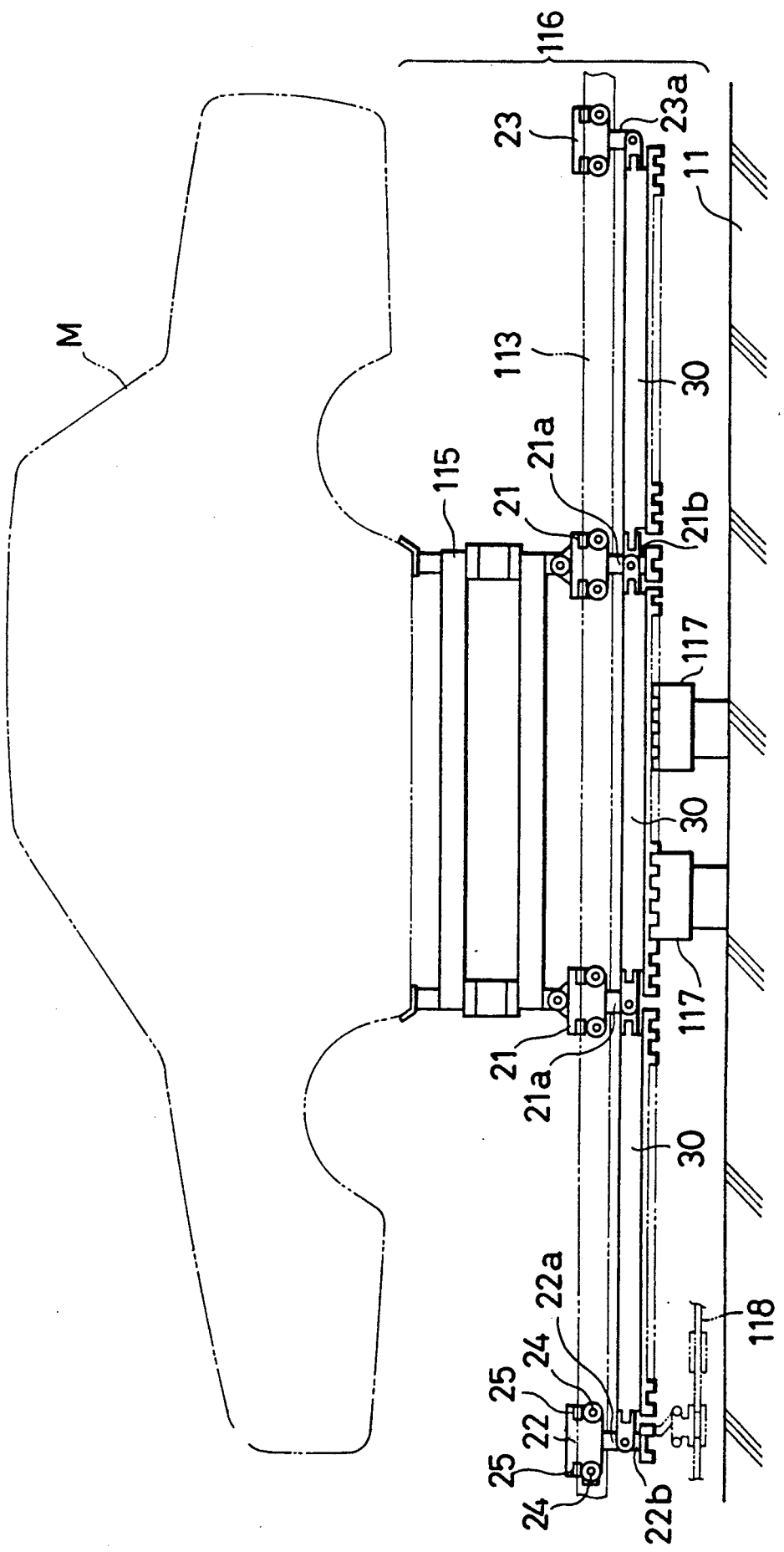
FIG. 1 is a front view of a first embodiment of this invention.
Figure 2:
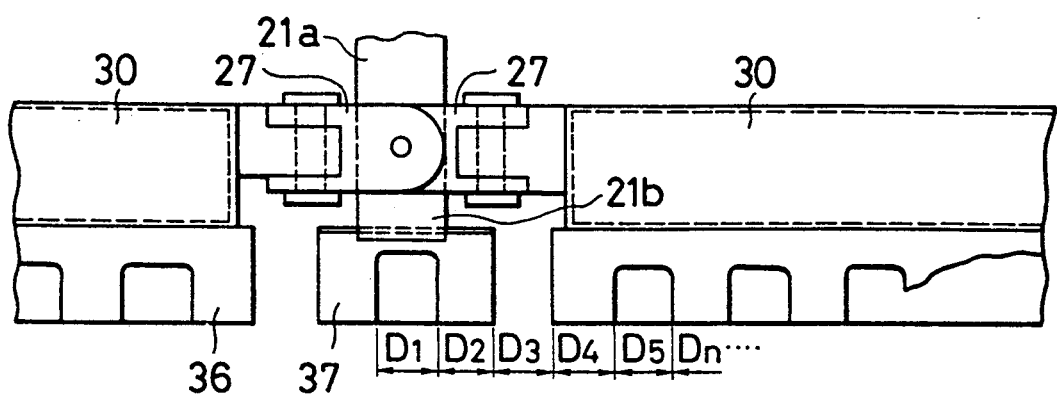
FIG. 2 is an enlarged front view showing the relationship between a connection member and a vertical shaft shown in FIG. 1.
Figure 3:
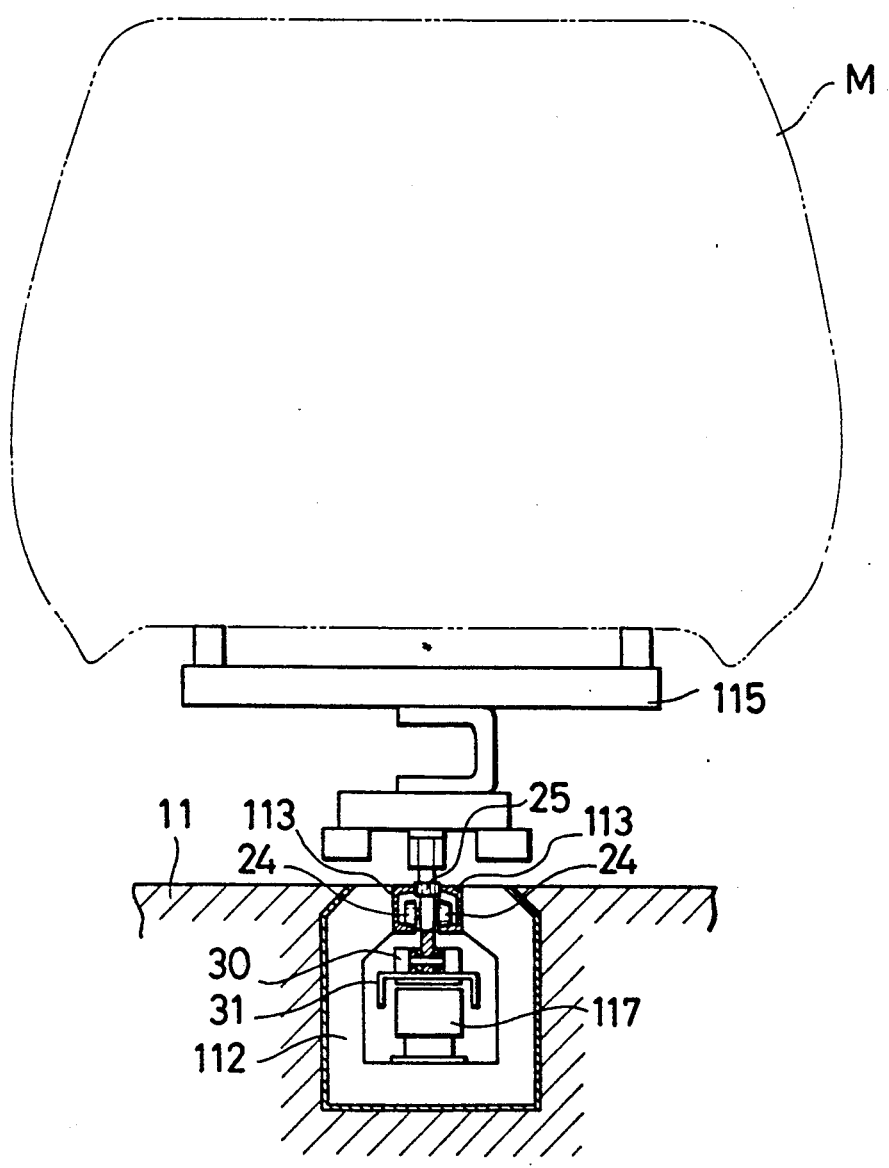
FIG. 3 is a side view of FIG. 1.

The first embodiment of the present invention is shown in FIGS. 1 to 4. This structure functions as the so-called "duplex" trolley conveyor. As shown in FIG. 3, within a pit which is provided under the floor 11, a pair of opposingly C-shaped carrier rails 13, 13 are provided immediately below the floor 11. Each of the trolleys 21, 21, 22 and 23 includes four carrier rollers 24 arranged both longitudinally and transversely so as to be accommodated within the rails 13, 13 and a single guide roller 25 held between the upper edges of the rails 13, 13 for preventing tilting of a carrying frame 15.

The trolleys comprise a pair of main trolleys 21, 21 for pivotably supporting a frame for carrying an article, such as an automotive body M, a front trolley 22 and a rear trolley 23. Additional trolleys may be provided. Each of the trolleys vertical shafts 21a, 21a, 22a and 23a having equal lengths. As shown in FIG. 2, through the vertical shafts and a pair of hinges 27, 27, connecting members 30 are pivotally connected both horizontally and vertically. The connecting members 30 also function as "distance bars" so as to maintain the distance between the trolleys. The front and rear trolleys 22 and 23 are located in front and rear of the conveyed article M, respectively, so as to prevent collision of the conveyed articles.

The carrying frame 15, trolleys 21, 21, 22 and 23 as well as the connecting members 30 form a conveyance body 16.

Figure 4:
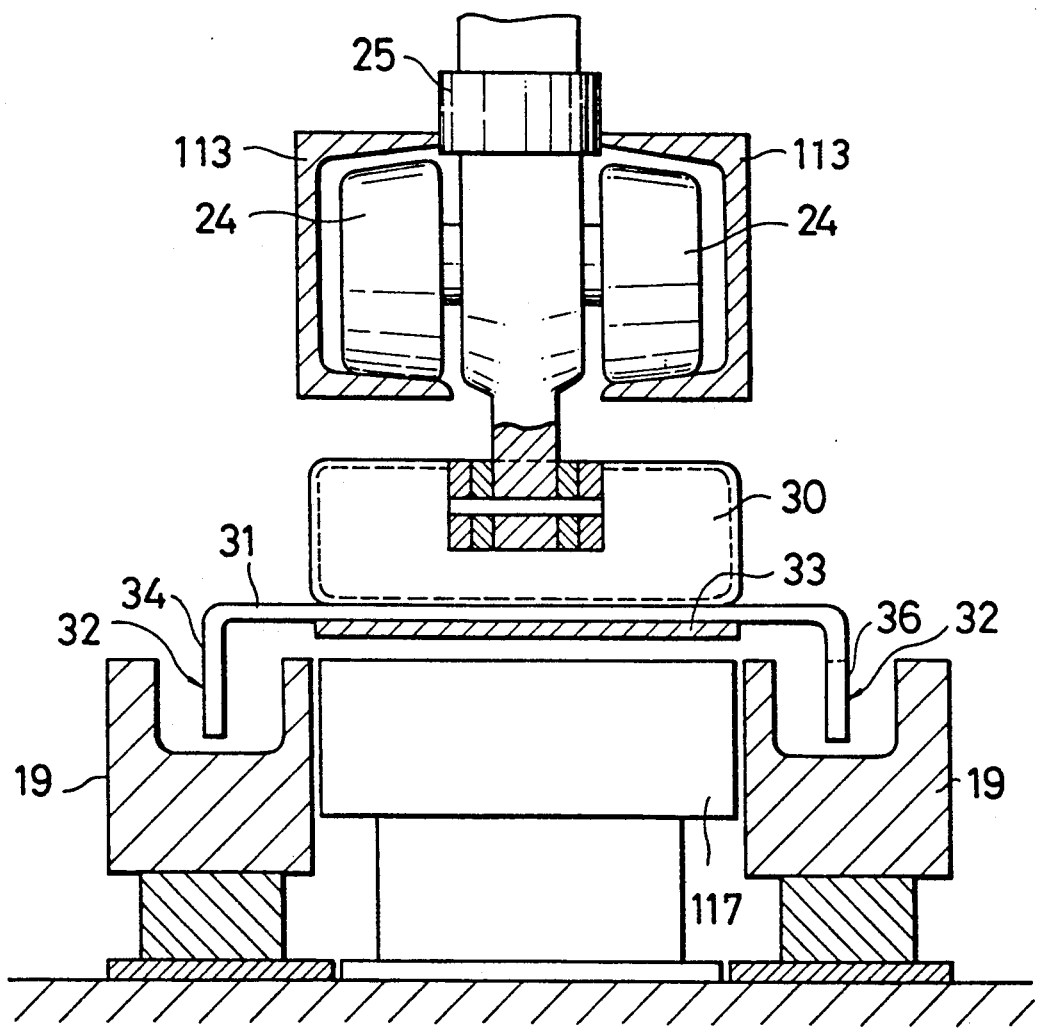
FIG. 4 is an enlarged side view showing the details of linear motor drive portion of FIG. 3.

As shown in FIG. 4, each of the connecting members 30 has a reaction plate 31 as a secondary member of a linear induction motor on the lower surface thereof and a pair of pendent shielding plates 32, 32 are provided at both ends thereof so as to provide a cover to the primary members 17 as described later. On the lower surface of the reaction plate 31 is secured a non-magnetic material plate 33 made of aluminum, copper and the like so as to increase electric conductivity for the secondary electric current. Primary members 17 of linear induction motor are provided within the pit 12 in a face-to-face relationship with the reaction plate 31.

Furthermore, to the vertical shafts 21a, 22a of the rear side main trolley 21 and the front trolley 22 are mounted pressure plates 21b, 22b respectively so as to engage with the driving chain 18. These pressure plates 21b, 22b are located above the lower surface of the non-magnetic body 33, and therefore, there will be no collision with the primary members 17 when linear motor drive is effected.

The pendent shielding plate 32, which is provided for the full length of the connecting member 30, is on one hand a slit-less plate 34 for detecting arrival of the conveyance body 16 and on the other hand is an intercepting plate 36 having saw-shaped slits with an equal pitch for detecting the moving speed of the conveyance body 16. Furthermore, each of the vertical shafts 21a, 22a to which the pressure plates 21b, 22b are formed has a separate intercepting plate 37 with the same pitch (D1, D2, D3, D4 . . . ) so as to make up for those portions where the intercepting plates 36 are not provided. And photoelectric elements 19 are adapted to detect arrival of the conveyance body 16 by means of the slit-less plate 34 and detect the frequency of interruption of light through the saw-shaped slit plate 36 so as to control the speed of the conveyance body 16, respectively.

The reaction plates 31 which receives the propelling force from the primary members 17 are independently provided to the pivotably supported connecting members 30 as explained above, the reaction plates 31 will not substantially deviate from the primary members 17 even if there are horizontal or slopes in the conveying path. Thus, the conveyance body 16 may be driven in a stable manner.

Figure 5:
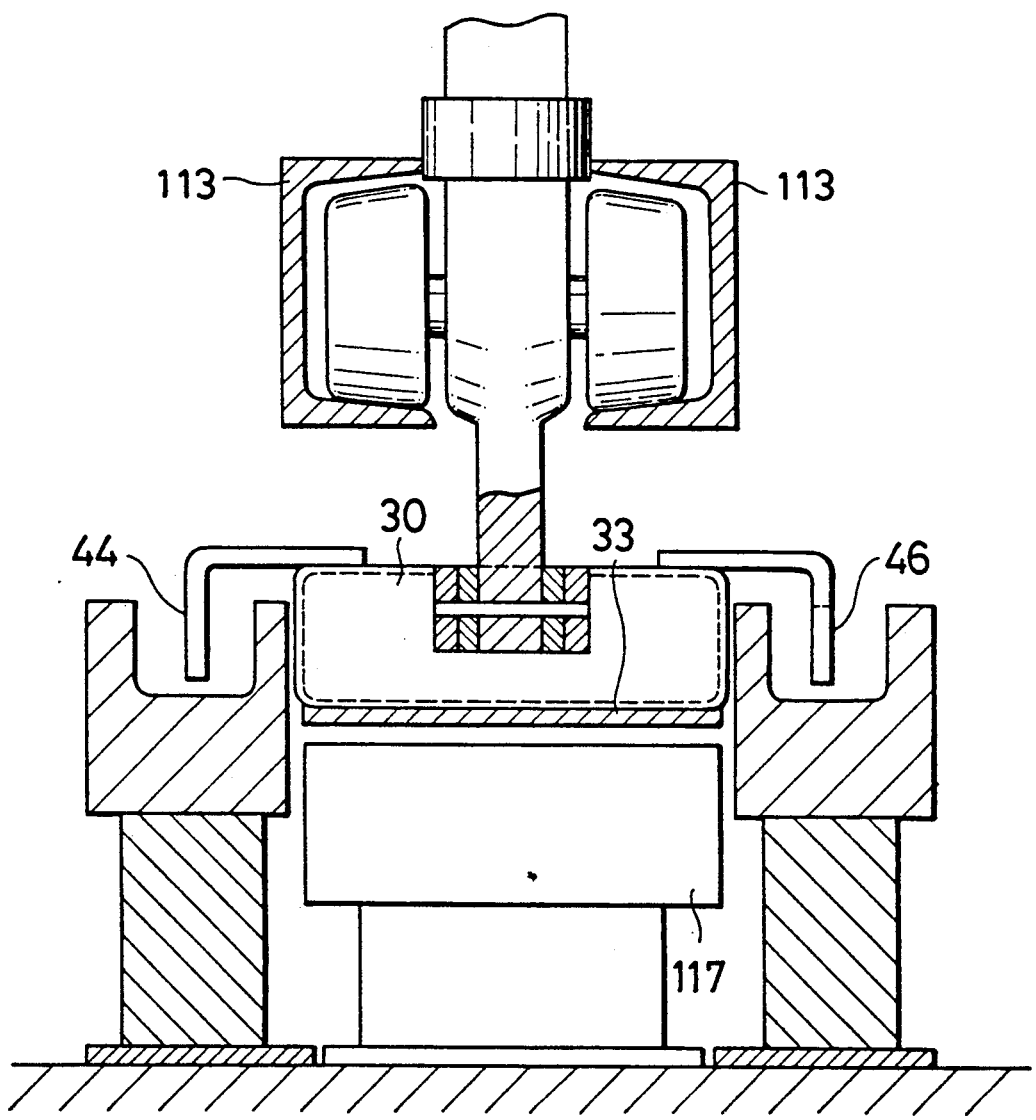
FIG. 5 is a modification of FIG. 4.

In the next place, FIG. 5 illustrates an improved embodiment in which possible interference between the pendent shielding plate and the primary members may be avoided. In this embodiment, the slit-less plate 44 and the saw-shaped slit plate 46 are mounted to the upper surface of the connecting member 30 instead of the lower surface. In this case, the lower surfaces of the connecting members 30 function as the reaction plates.

Figure 6:
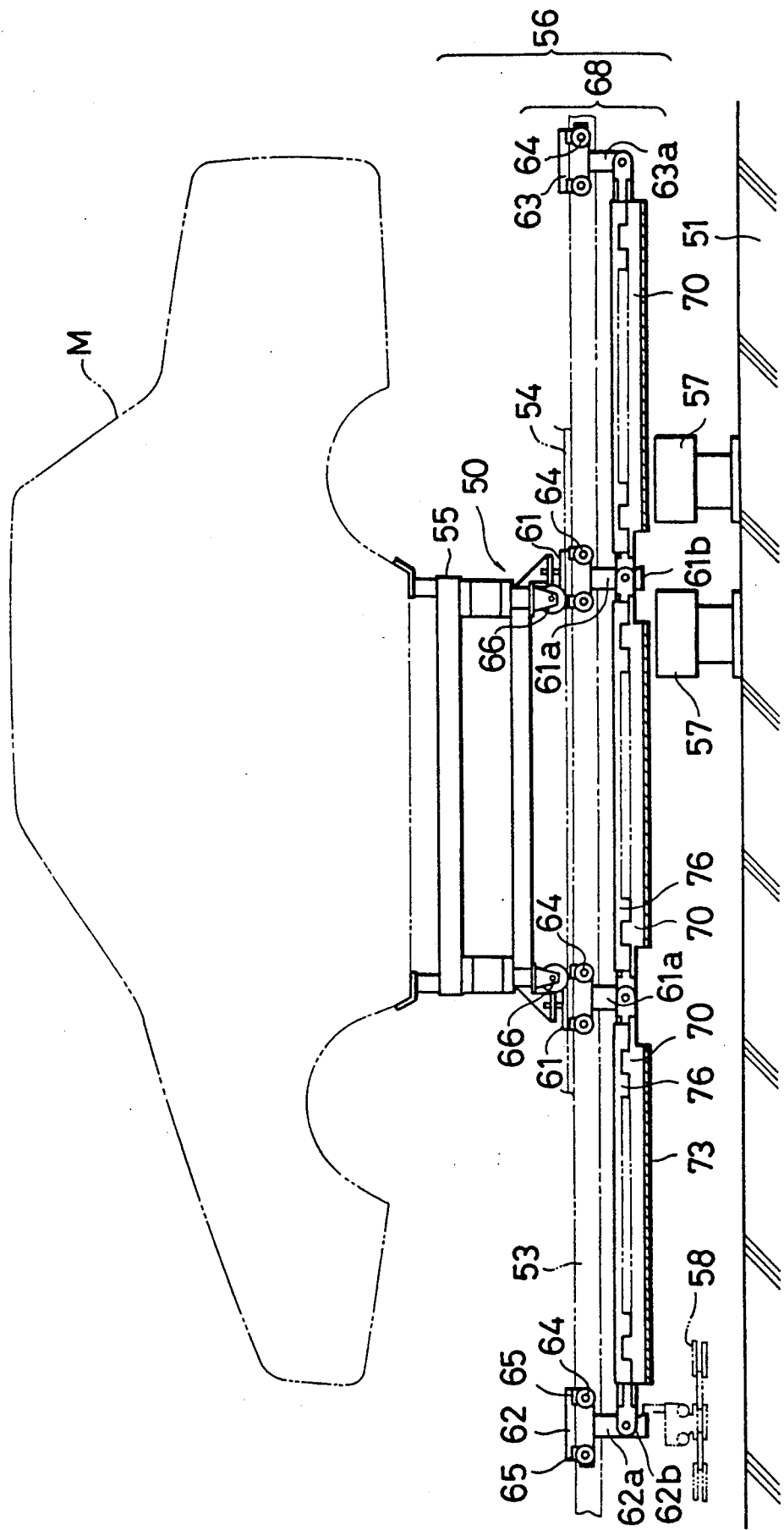
FIG. 6 is a front view of a second embodiment of this invention.
Figure 7:
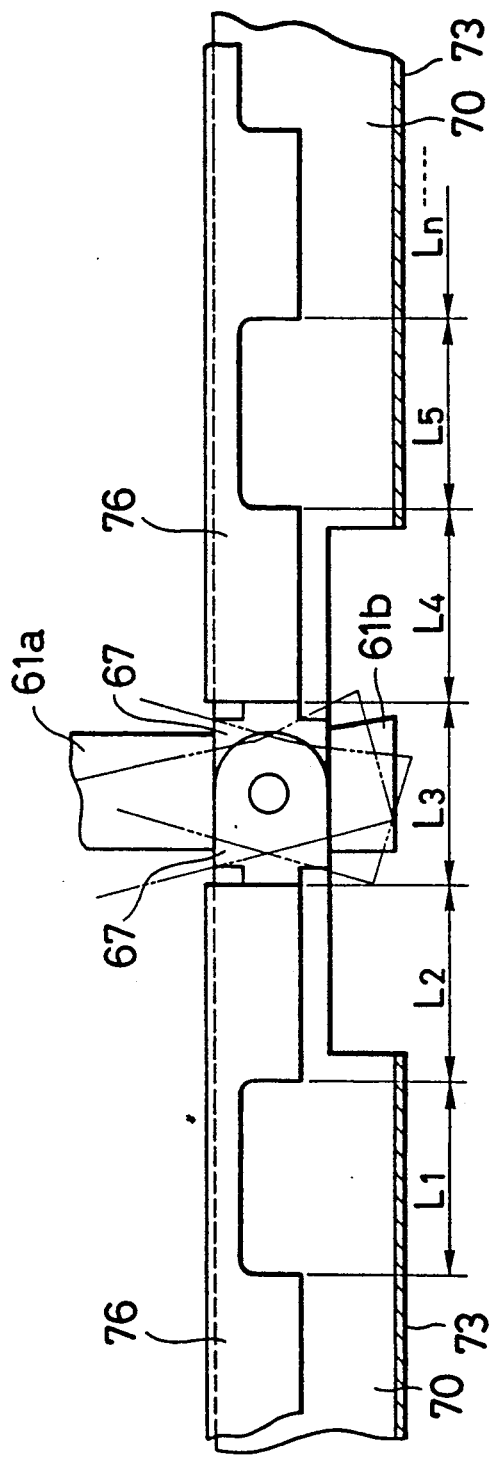
FIG. 7 is an enlarged front view showing the relationship between a connection member and a vertical shaft shown in FIG. 6.
Figure 8:
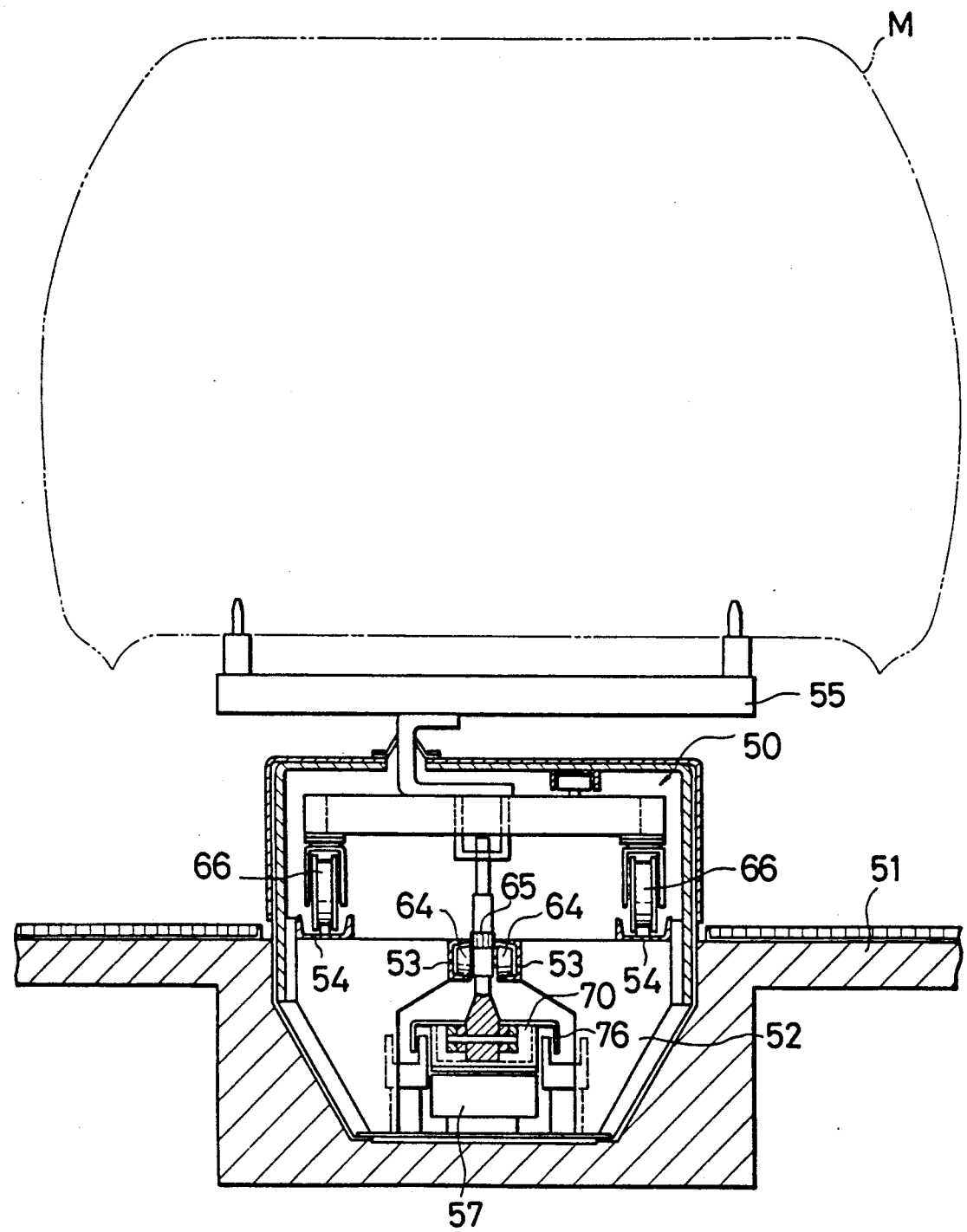
FIG. 8 is a side view of FIG. 6.

FIGS. 6 to 8 show a second embodiment of this invention in the form of a truck type conveyor. As shown in FIG. 8, within a pit which is provided under the floor 51, a pair of opposingly C-shaped carrier rails 53, 53 are provided immediately below the floor 51. Each of the trolleys includes four carrier rollers 64 arranged both longitudinally and transversely so as to be accommodated within the rails 53, 53 and a single guide roller 65 held between the upper edges of the rails 53, 53 for preventing tilting of a carrying frame 55. The carrying frame 55 upon which a conveyed article M, such as, an automotive body is supported, has running wheels 66 on the lower surface thereof so as to form a truck 50. The wheels 66 are adapted to run on the concave guide rails 54 provided on the floor.

The trolleys comprise a pair of main trolleys 61, 61 for pivotably supporting the truck 50, a front trolley 62 and a rear trolley 63. Each of the trolleys has vertical shafts 61a, 61a, 62a and 63a having equal lengths. Through the vertical shafts and a pair of hinges 67, 67, connecting members 70 are pivotably connected both horizontally and vertically. The front and rear trolleys 62 and 63 are located in front and rear of the conveyed article M, respectively, so as to prevent collision of the conveyed articles.

The trolleys 61, 61, 62, 63 and the connecting members 70 form a trolley connection body 68; and the trolley connection body 68 and the truck 50 form a conveyance body 56.

On the upper surface of each of the connecting members 70, there is provided a saw-shaped slit plate 76 in order to sense the running speed of the truck 50. As shown in FIG. 7, the spacing between the adjacent slit plates 76, 76 immediately below each trolley is identical with the pitch of the slits (L1=L2=L3=L4=L5 . . . =Ln). The lower surface of the connecting member 70 functions as the reaction plate forming a secondary member of linear induction motor; and on the lower surface, there is provided non-magnetic plate 73 made of aluminum or copper so as to increase electric conductivity for the secondary electric current.

Furthermore, to the vertical shafts 61a, 62a of the rear side main trolley 51 and the front trolley 52 are mounted pressure plates 61b, 62b respectively so as to engageable with the driving chain 58. These pressure plates 61b, 62b are located above the lower surface of the non-magnetic body 73, and therefore, there will be no collision with the primary members 57 when linear motor drive is effected.

In this embodiment as well, the connecting members 70 to which the propelling force is provided from the primary members 57 will not, owing to the pivotably connection, substantially deviate from the primary members 57 even if there are horizontal curves or slopes in the conveying path, and consequently, the conveyance body 58 may stably be driven by linear motor.

Figure 9:
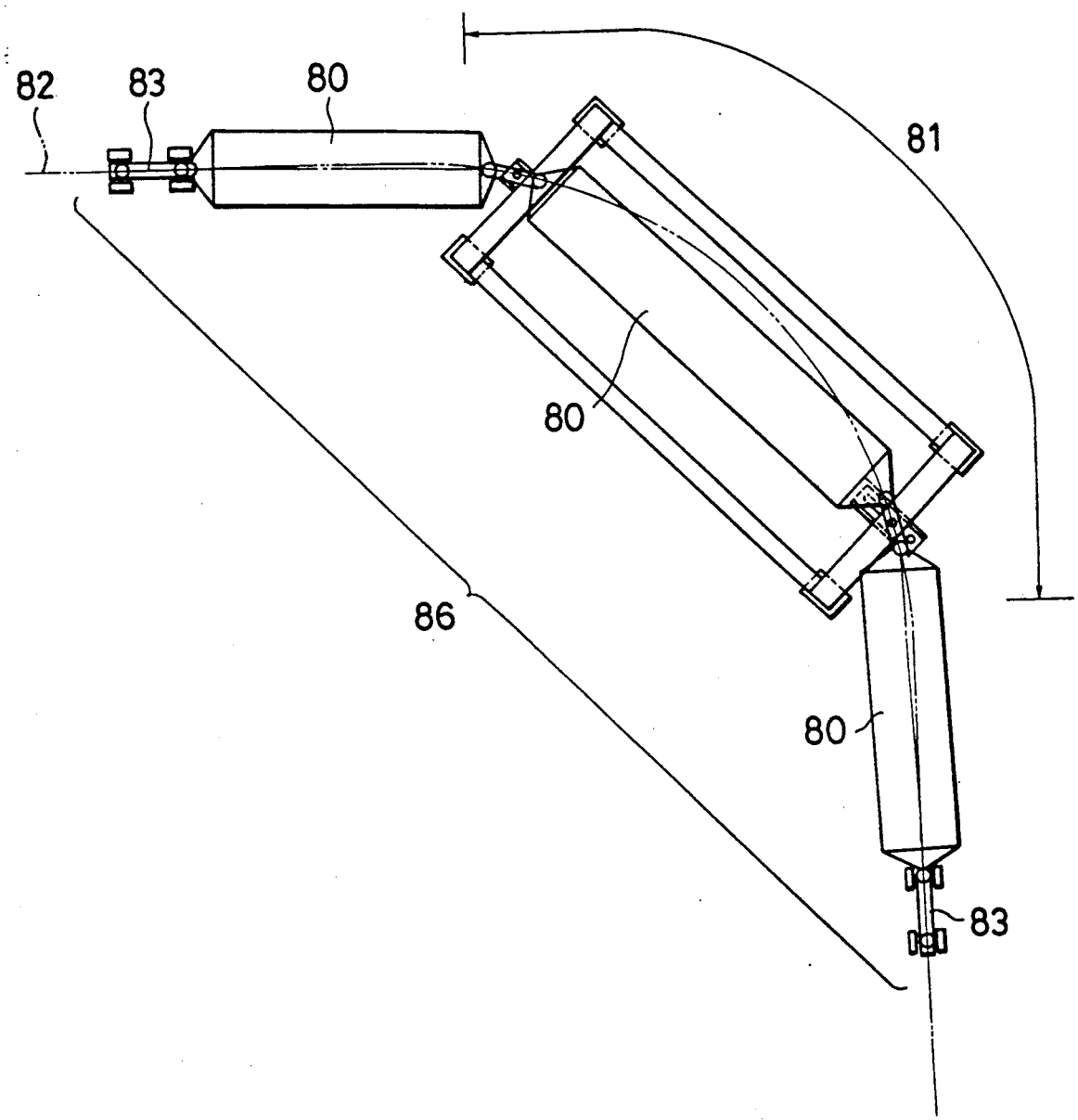
FIG. 9 is a plan view of the conveyor in a horizontal curve.

According to the present invention, as shown in FIG. 9, linear motor drive is possible even if there is a horizontal curve 81 having a relatively large curvature in the conveying path 82. Namely, primary members are not usually provided in such a curved portion 81, and consequently, no propelling force is provided to the conveyance body 86 at such a section. However, by providing primary members at the straight portions before and after the curved portion, propelling force may be given to the body 86 through the connecting members 80 which are divided by means of the trolleys 83.

In the next place, the present invention is directed to a problem which arises from the fact that the reaction plates may not come to an exact face-to-face relationship with the primary members in a horizontally curved portion of the conveying path.

Figure 10:
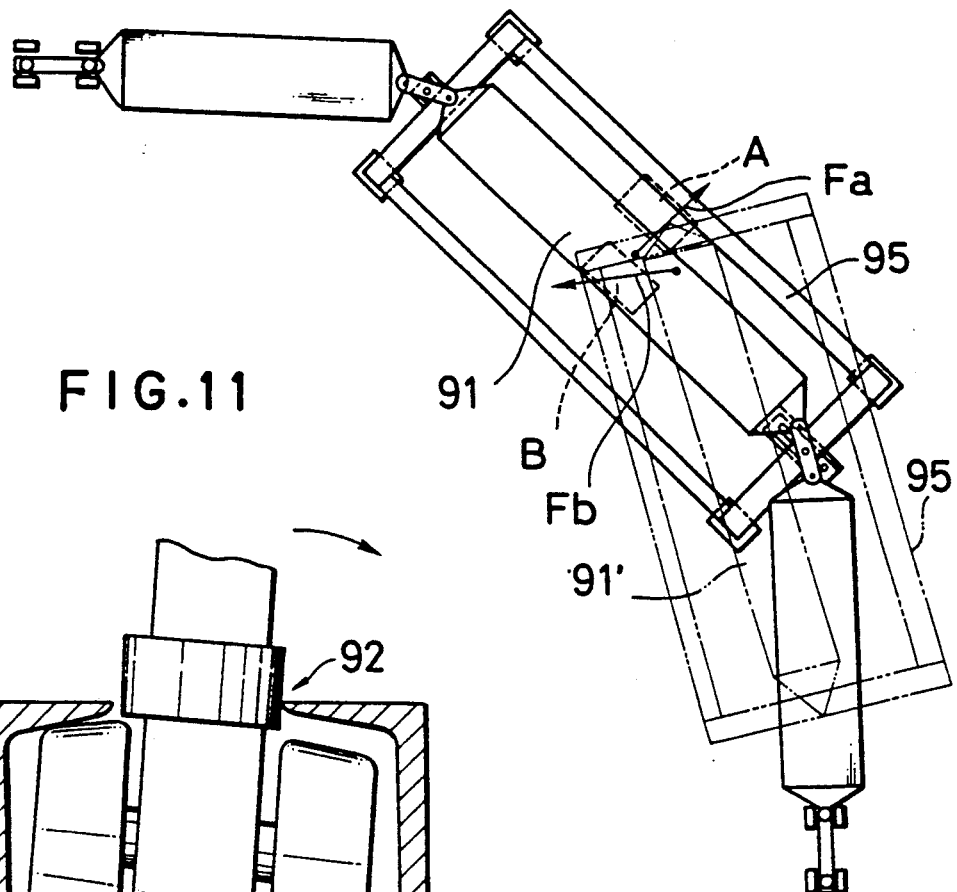
FIG. 10 is a plan of the conveyor showing the function at a horizontal curve.

Namely, as illustrated in FIG. 10, as the trolleys come to a curved portion of the conveying path, the connecting members (and the reaction plates associated with the connecting members) come to the position of the chord of an arc. If the primary member 97 is located at the position A which is immediately below the carrier rail, the reaction plate 91 is subjected to the magnetic attractive force Fa in the transverse direction; and if the primary member 97 is situated at the position B, the reaction plate 91 is subjected to the transverse magnetic attractive force Fb in the opposite direction. In fact, these forces are momental forces with the trolley 92 in the center.

This causes the connecting member 90 and the carrying frame 95 to tilt. This leads to the inability to keep the gap between the reaction plate 91 and the primary member 97 constant and to hold the conveyed article stably.

Accordingly, an object of the second invention is to provide a trolley conveyor in which the gap between the reaction plate and the primary member may be maintained accurately even in a horizontal curve of the conveying path.

Figure 13:
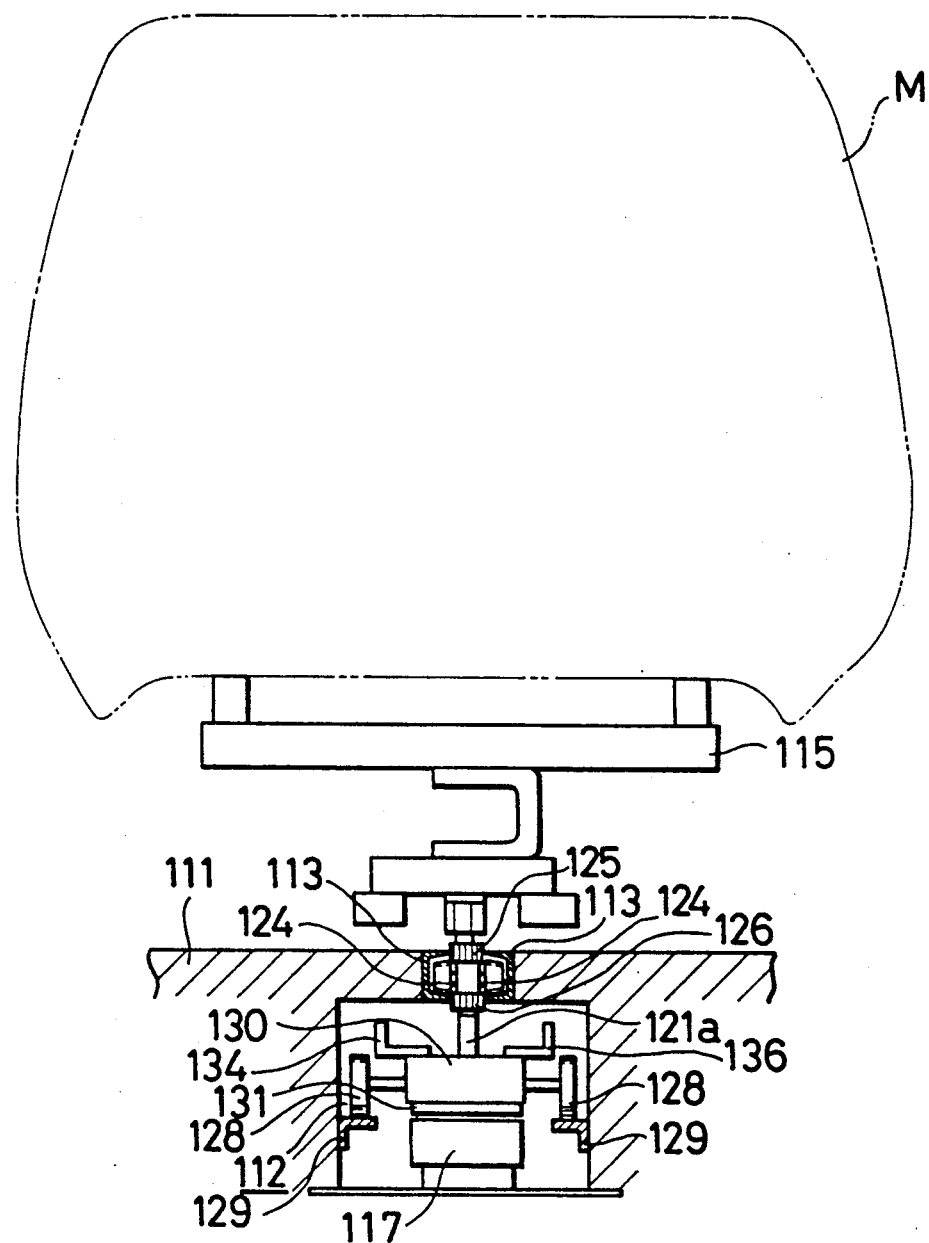
FIG. 13 is a side view of FIG. 12.

FIGS. 12 to 15 show a third embodiment of this invention, which functions substantially the same as the previous embodiments. As shown in FIG. 13, within a pit 112 which is provided under the floor 111, a pair of opposingly C-shaped carrier rails 113, 113 are provided immediately below the floor 111. Each of the trolleys 121, 121, 122, 123 includes four carrier rollers 124 arranged both longitudinally and transversely so as to be accommodated within the rails 113, 113 and a single guide roller 125 held between the upper edges of the rails 113, 113 for preventing tilting of a carrying frame 115. Another single guide roller 126 is held between the lower edges of the rails 113, 113 for the similar purpose.

The trolleys comprise a pair of main trolleys 121, 121 for pivotably supporting the carrying frame 115, a front trolley 122 and a rear trolley 123. Each of the trolleys has vertical shafts 121a, 121a, 122a and 123a having equal lengths. Through the vertical shafts and a pair of hinges 127, 127, connecting members 130 are pivotably connected both horizontally and vertically. The front and rear trolleys 122 and 123 are located in front and rear of the conveyed article M, respectively, so as to prevent collision of the conveyed articles.

A pair of tilting prevention rollers 128, 128 are provided to each of the connecting members 130 at the longitudinally intermediate position thereof so as to project laterally. Within the pit 112, a pair of guide rails 129, 129 each having a L-shaped lateral section are disposed so as to support the rollers 128, 128 on the upper surfaces thereof. The upper surfaces of the guide rail 129 is lower than the lower surface of the reaction plate 131.

The frame 115, trolleys 121, 121, 122, 123 and the connecting members 130 form a conveyance body 116.

Figure 14:
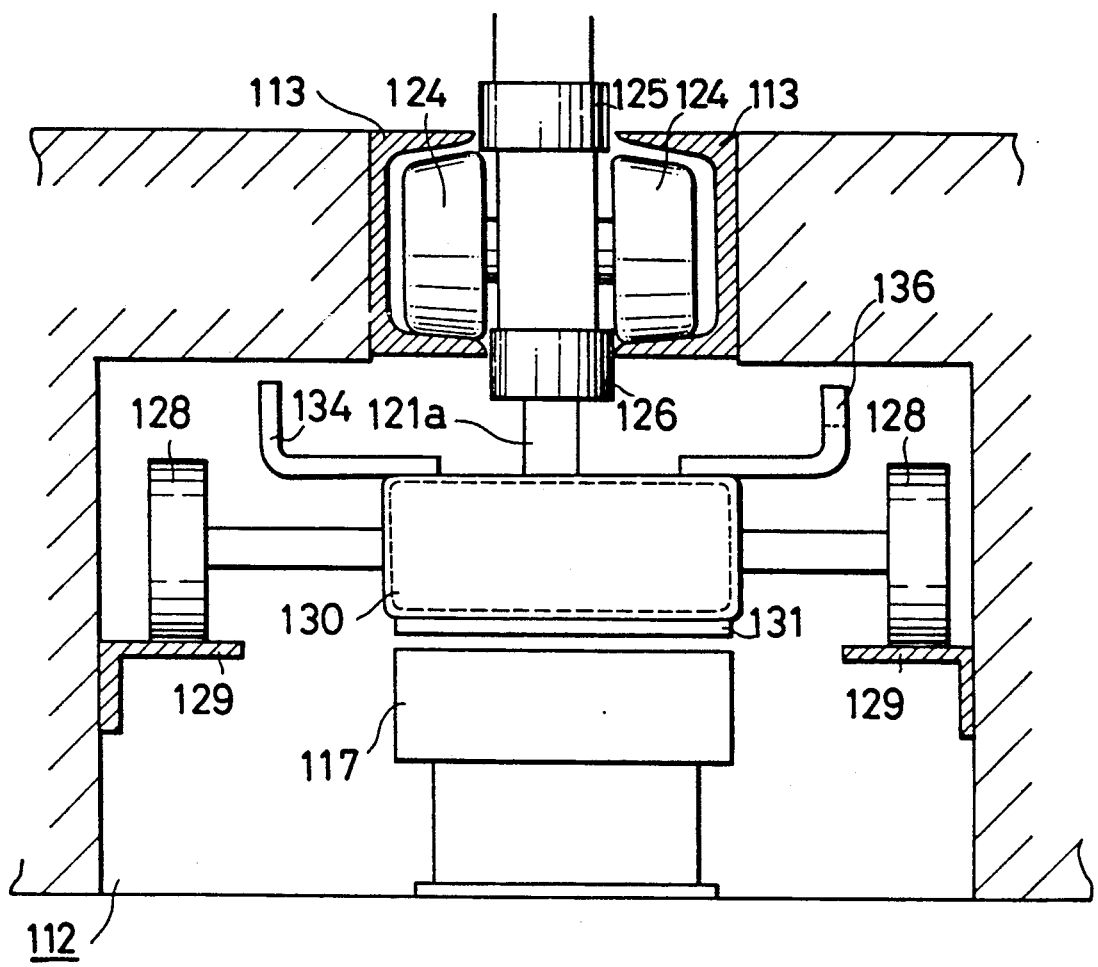
FIG. 14 is an enlarged view within a pit.
Figure 15:
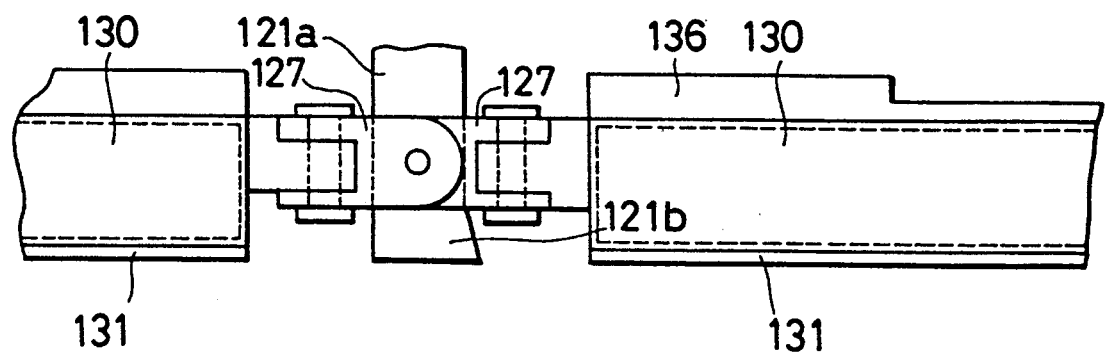
FIG. 15 is an enlarged front view showing the relationship between a connection member and a vertical shaft shown in FIG. 12.

As shown in FIG. 14, a reaction plate 131 is attached to the full length of the lower surface of each of the connecting members 130s so as to form a secondary member of linear induction motor. In the linear-motor-driving section, a plurality of primary members 117 of the linear induction motor are provided to so as to oppose the reaction plate 131.

Furthermore, to the vertical shafts 121a, 122a of the rear side main trolley 121 and the front trolley 122 are mounted pressure plates 121b, 122b respectively so as to engage with the driving chain 118. These pressure plates 121b, 122b are located above the lower surface of reaction plate 131, and therefore, there will be no collision with the primary members 117 when linear motor drive is effected.

On the upper surface of the connecting member 130, a slit-less plate 134 to sense arrival of the conveyance body 116 and a saw-shaped slit plate 136 to detect the running speed are secured so as to extend the full length thereof.

According to this embodiment, the reaction plate 131 opposing the primary member 117 may be prevented from moving up and down by means of the rollers 128, 128, so as to keep the gap between the reaction plate 131 and the primary member 117 constant. As a result, the conveyance body 116 may be stably conveyed.

In case of the previous embodiments, when the weight of the conveyed article must be born by the main trolleys, there is a likelihood of elastic deformation of the carrier rollers resulting in the change of the gap, and there is also a likelihood of creation of play in the connecting portion of the main trolleys with the connecting members resulting in contact of the reaction plate with the primary members. Such problems may be solved by this particle embodiment owing to the tilting prevention rollers 128, 128 secured to the connecting members 130.

Figure 11:
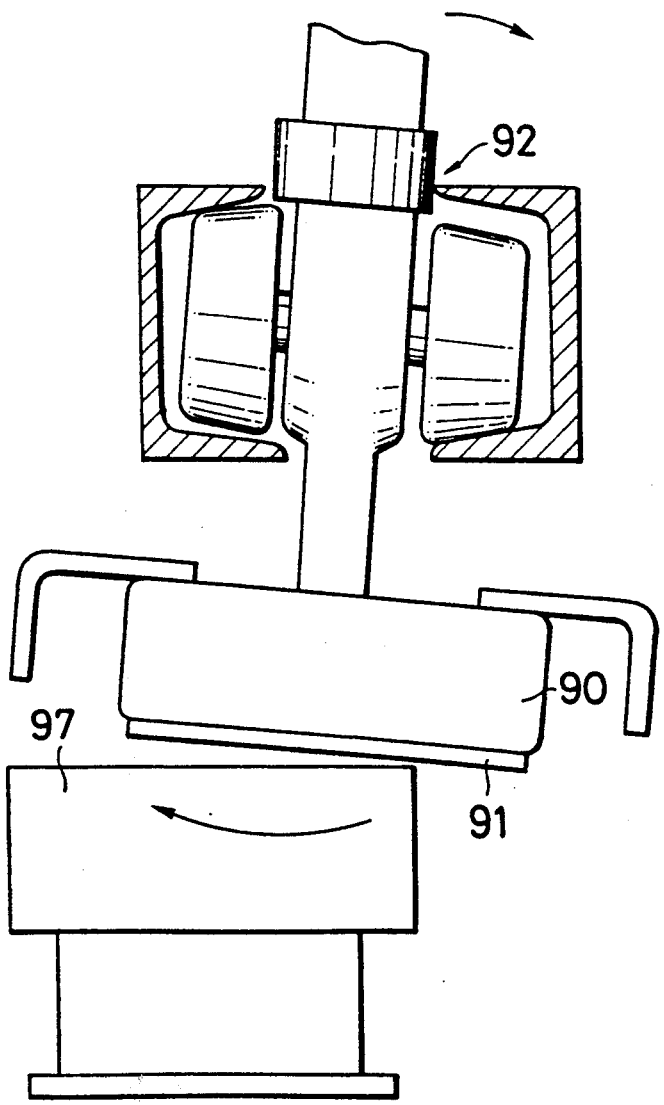
FIG. 11 is an enlarged view at point B of FIG. 10.
Figure 12:
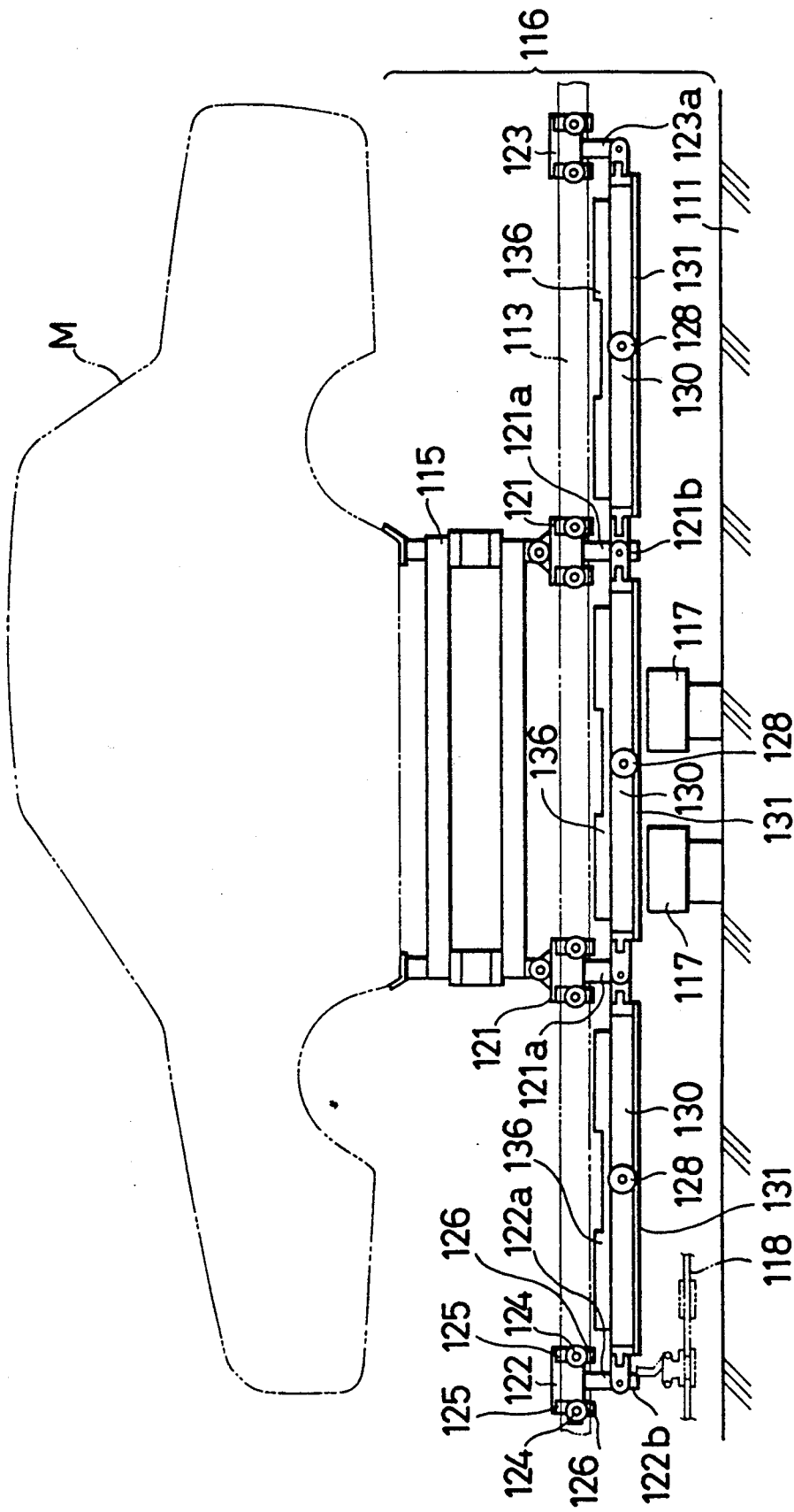
FIG. 12 is a front view of a conveyor of a third embodiment.

It will be appreciated that even if a momental force acts on the reaction plate 131 at a curved portion of the conveying path as mentioned before with respect to FIG. 11, tilting of the conveyance body 116 may be prevented by the rollers 128, 128. Moreover, the guide rails 129, 129 being provided lower than the reaction plate 131, the connecting member 130 will not collide with the guide rails 129, 129 even when the connecting member 130 comes to the position of the chord of an arc in a horizontal curve.

Figure 16:
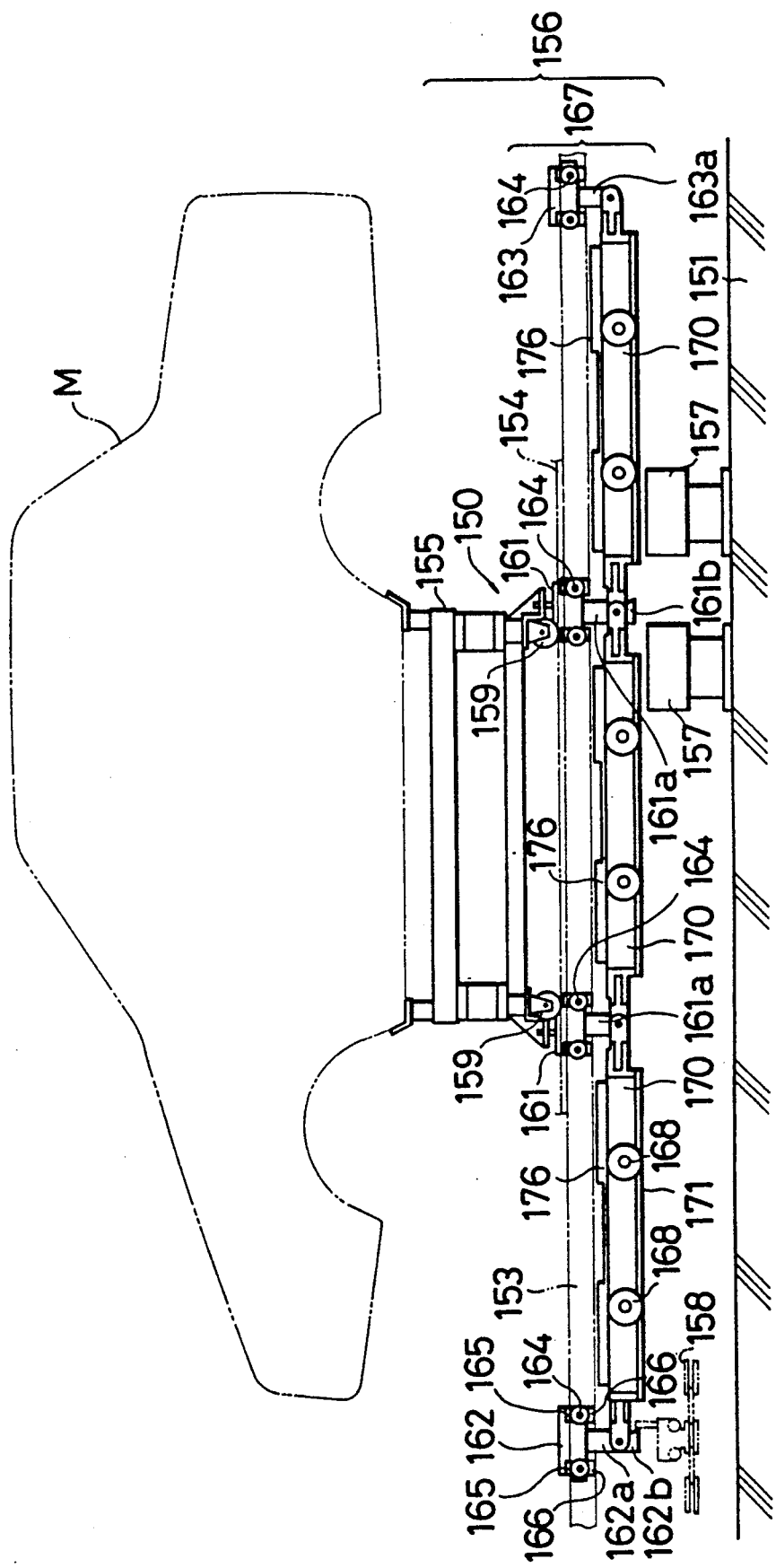
FIG. 16 is a front view of a fourth embodiment of this invention.
Figure 17:
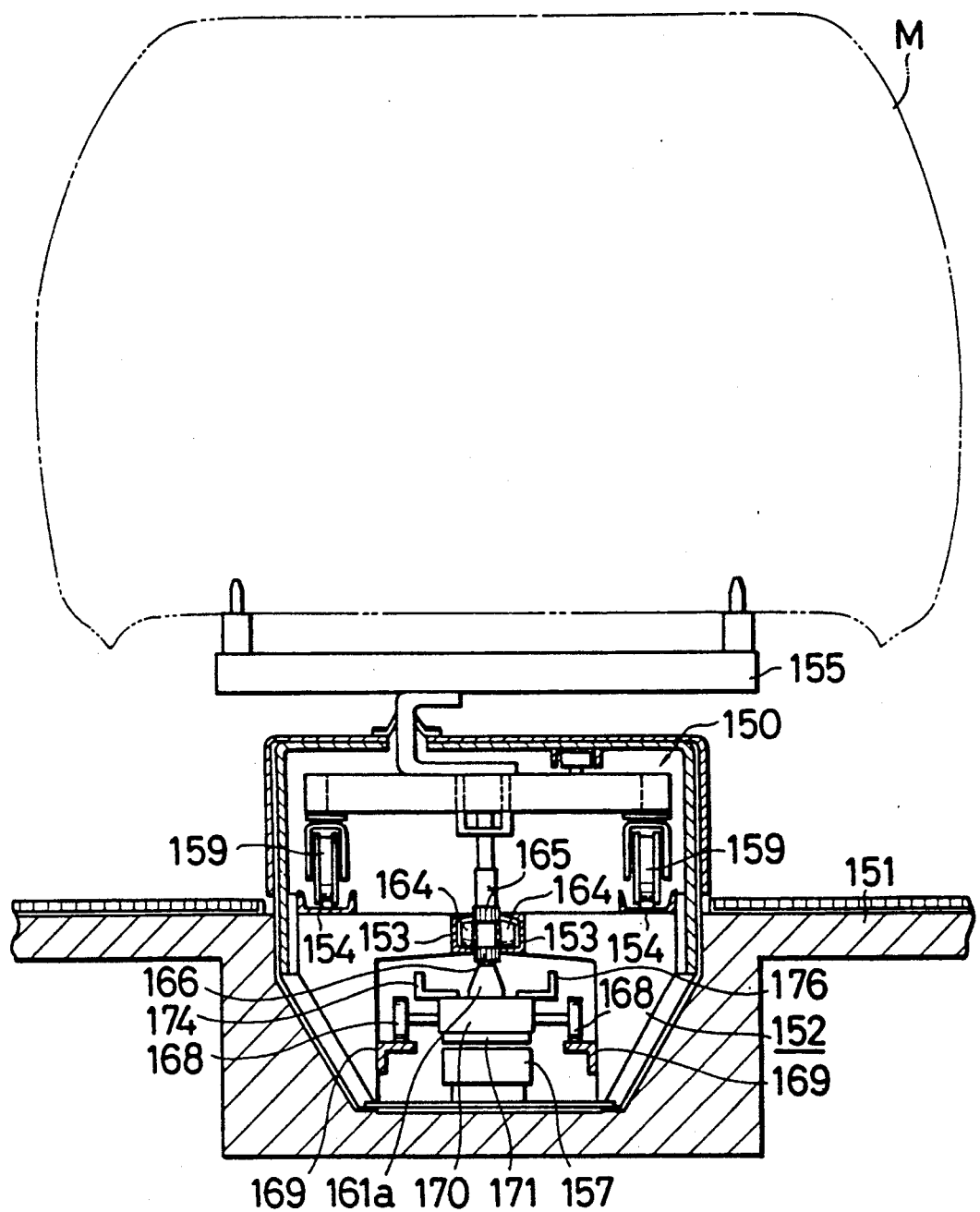
FIG. 17 is a side view of FIG. 16.

Lastly, FIGS. 16 and 17 show a fourth embodiment of this invention. As shown in FIG. 17, within a pit 152 which is provided under the floor 151, a pair of opposingly C-shaped carrier rails 153, 153 are provided immediately below the floor 151. Each of the trolleys 161, 161, 162, 163 includes four carrier rollers 164 arranged both longitudinally and transversely so as to be accommodate within the rails 153, 153 and a single guide roller 165 held between the upper edges of the rails 153, 153 for preventing tilting of a carrying frame 155. Another single guide roller 166 is held between the lower edges of the rails 153, 153 for the similar purpose. The carrying frame 155 has running wheels 159 so as to form a truck. The wheels 159 are adapted to run on the concave guide rails 154 provided on the floor.

The trolleys comprise a pair of main trolleys 161, 161 for pivotably supporting the carrying frame 155, a front trolley 162 and a rear trolley 163. Each of the trolleys has vertical shafts 161a, 161a, 162a and 163a having equal lengths. Through the vertical shafts and a pair of hinges, connecting members 170 are pivotably connected both horizontally and vertically. The front and rear trolleys 162 and 163 are located in front and rear of the conveyed article M, respectively, so as to prevent collision of the conveyed articles.

Two pairs of tilting prevention rollers 168, 168 are provided to each of the connecting members 170 adjacent the front and rear ends thereof so as to project laterally. Within the pit 152, a pair of guide rails 169, 169 each having a L-shaped lateral section are disposed so as to support the rollers 168, 168 on the upper surfaces thereof. The upper surfaces of the guide rail 169 is lower than the lower surface of the reaction plate 171.

The trolleys 161, 161, 162, 163 and the connecting members 170 form a trolley connection body 167; and the trolley connection body 167 and the truck 150 form a conveyance body 156.

As was the case with the previous embodiments, slit-less plate 174 and a saw-shaped slit plate 176 are provided on the upper surface of each of the connecting members 170. Also, the lower surface of the connecting members 170 has a reaction plate 171 to form a secondary member of a linear induction motor.

Furthermore, to the vertical shafts 161a, 162a of the rear side main trolley 161 and the front trolley 122 are mounted pressure plates 161b, 162b which are engageable with the pushers of the driving chain 158. These pressure plates 161b, 162b are located above the lower surface of reaction plate 171, and therefore, there will be no collision with the primary members 157 when linear motor drive is effected.

Figure 18:
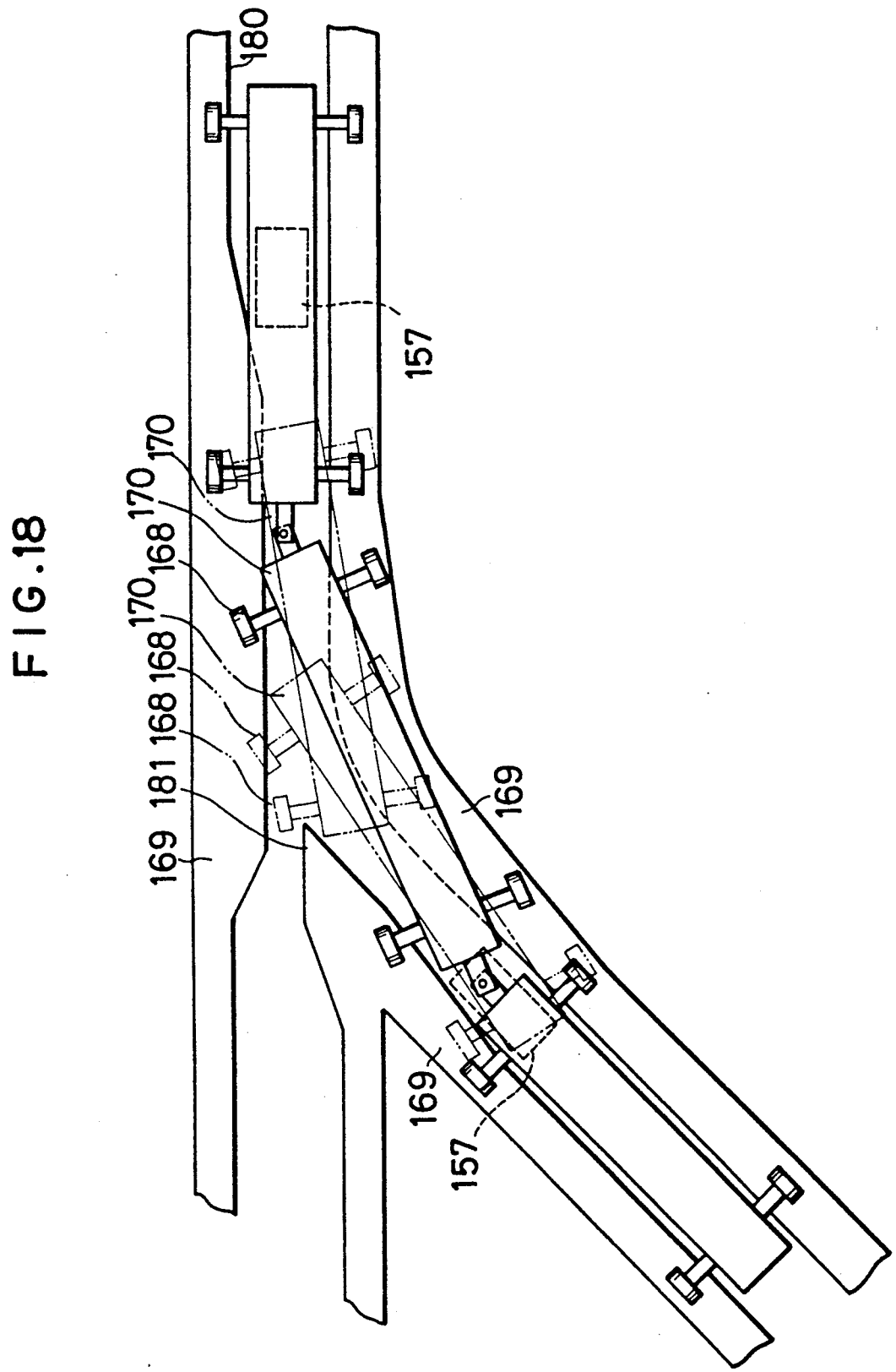
FIG. 18 is a plan view of trolleys running along a conveying path having a branch.

This last embodiment is particularly effective for maintaining the positional stability of the reaction plate owing to the two pairs of tilting prevention rollers 168 provided to each of the connecting members 170. For example, when the conveyance body 156 is moving along a switching rail in a conveying path 180 as shown in FIG. 18, there is a likelihood that a roller 168 falls into a slit 181 due to the magnetic attractive force from the primary member 157. But, by providing two pairs of the rollers 168 to each connecting member 170 adjacent the front and rear ends thereof, this problem can be solved and the reaction plate 171 can keep the horizontal position at all times.

Lastly, it is possible to prevent floating of the tilting prevention rollers by using channel-shaped guide rails (not shown). Furthermore, although the combination of the saw-shaped slit plate and photoelectric element for detecting the light through the slit is usually used for speed detection, it is also possible to detect the speed by means of the light reflected from the slit plate. Since, at the curved portion, the connecting members travel, being somewhat deviated from the conveying path, the latter method may advantageously be utilized.

What is claimed is:

1. A linear motor driven trolley conveyor comprising a carrier rail and primary members, said primary members forming parts of a linear induction motor, a carrier including trolleys spaced along the longitudinal direction of the carrier rail and adapted to run along said carrier rail, connecting members pivotally interconnecting said trolleys, pivot means connecting respective ends of said connecting members with adjacent trolleys, said pivot means permitting the respective ends of the connecting members to pivot both vertically and horizontally relative to the adjacent trolleys, and lower surfaces of said connecting members each having a reaction plate of said linear induction motor.

2. The conveyor according to claim 1, wherein at least one of the trolleys includes a pressure plate selectively engageable with a driving chain.

3. The conveyor according to claim 1, wherein each said pivot means is in the form a hinge.

4. The conveyor according to claim 3, wherein each said hinge is horizontally pivotally connected to one of said connecting members and vertically pivotally connected to one of said trolleys.

5. A linear motor driven conveyor comprising a carrier rail and primary members, said primary members forming parts of a linear induction motor, a carrier including trolleys spaced along the longitudinal direction of the carrier rail and adapted to run along said carrier rail, connecting members forming parts of said linear induction motor and pivotally interconnected said trolleys, pivot means connecting respective ends of said connecting members with adjacent trolleys, said pivot means permitting the connecting members to pivot both vertically and horizontally relative to the adjacent trolleys, at least one pair of tilting prevention rollers connected to said carrier, and guide rails parallel to said carrier rail for supporting said rollers.

6. The conveyor according to claim 5, wherein at least one of the trolleys includes a pressure plate selectively engageable with a driving chain.

7. The conveyor according to claim 5, wherein each said pivot means is in the form of a hinge.

8. The conveyor according to claim 7, wherein each said hinge is horizontally pivotally connected to one of said connecting members and vertically pivotally connected to one of said trolleys.

* * * * *

UNITED STATES PATENT AND TRADEMARK OFFICE
CERTIFICATE OF CORRECTION

PATENT NO. : 5,014,625

DATED : May 14, 1991

INVENTOR(S) : Masasumi Murai, Koichi Mizuguchi and Jun Nishiyama

It is certified that error appears in the above-identified patent and that said Letters Patent is hereby corrected as shown below:

Col. 4, line 68:  Change "pivotably" to --pivotable--.

Col. 5, line 4:   Change "58" to --56--.

Col. 6, line 46:  Change "particle" to --particular--.

Signed and Sealed this

Eighth Day of September, 1992

*Attest:*

DOUGLAS B. COMER

*Attesting Officer*   Acting Commissioner of Patents and Trademarks